INVENTOR.
VERNON R. HORN

United States Patent Office 3,592,589
Patented July 13, 1971

3,592,589
METHOD OF REMOVING ALUMINUM FROM
BARIUM SULFIDE SOLUTIONS
Vernon R. Horn, Coffeyville, Kans., assignor to The
Sherwin-Williams Company, Cleveland, Ohio
Filed Mar. 18, 1969, Ser. No. 808,141
Int. Cl. C01f 11/08, 11/10
U.S. Cl. 23—134                                          5 Claims

ABSTRACT OF THE DISCLOSURE

Aluminum oxide impurities are removed from aqueous barium sulfide solution by contacting the solution with anhydrous magnesia-containing solid particles. The aluminum oxide impurity is reduced below 0.02 gram/liter by this treatment. The preferred magnesium oxide material is calcined magnesite in a particle size smaller than 200 mesh. The magnesium oxide and aluminum oxide solids are separated from the purified solution by filtering or centrifuging the mixture.

BACKGROUND OF THE INVENTION

In the manufacture of barium hydroxide and barium carbonate from baryte ores, the raw material (principally barium sulfate) is heated with carbon to produce black ash. By leaching the black ash with hot water, barium sulfide is recovered as a leach liquor along with several impurities. Subsequent filtration of the leach liquor will not remove aluminum oxide impurities. In order to prevent the precipitation of undesired aluminum compounds with the barium products made from the barium sulfide leach liquor, it is necessary to purify the leach liquor to remove substantially all of the aluminum impurities. These impurities are believed to be present in the form of soluble barium aluminate, but hereafter are expressed as the oxide $Al_2O_3$.

Pure barium carbonate or barium hydroxide are useful in the manufacture of ceramics, glasses, electronic components, and as intermediates in the manufacture of various chemical compounds.

BRIEF SUMMARY OF THE INVENTION

It has been discovered that substantially complete removal of aluminum impurities can be achieved by contacting the barium sulfide solution with anhydrous magnesia-containing particles. More than 90 wt. percent of the impurity can be removed using a weight ratio of magnesium oxide to aluminum oxide greater than about 4:1.

While partial removal of the impurities can be obtained at lower temperatures, treatment of the leach solution at about 60° C. to 100° C. for about one hour removes all but trace amounts of the impurity. Also, the solubility of barium sulfide in water is much higher at these temperatures than at ambient temperatures. Leach liquor from the black ash leaching operation is usually supplied at 65° C. to 75° C., and most of the examples use this temperature for the treatment for removing aluminum impurities. These concentrated solutions have a specific gravity of about 1.12 to 1.15 and contain about 145 to 175 grams of barium sulfide per liter. By reducing the aluminum impurity content below about 0.02 g./l., pure barium compounds may be produced from the barium sulfide solution by addition of hydroxide or carbonate ions.

Although no definite proof of a specific chemical reaction has been found, it is believed that this treatment converts a soluble barium-aluminum oxide material to an insoluble precipitate.

THE DRAWING

DESCRIPTION

Figure 1:
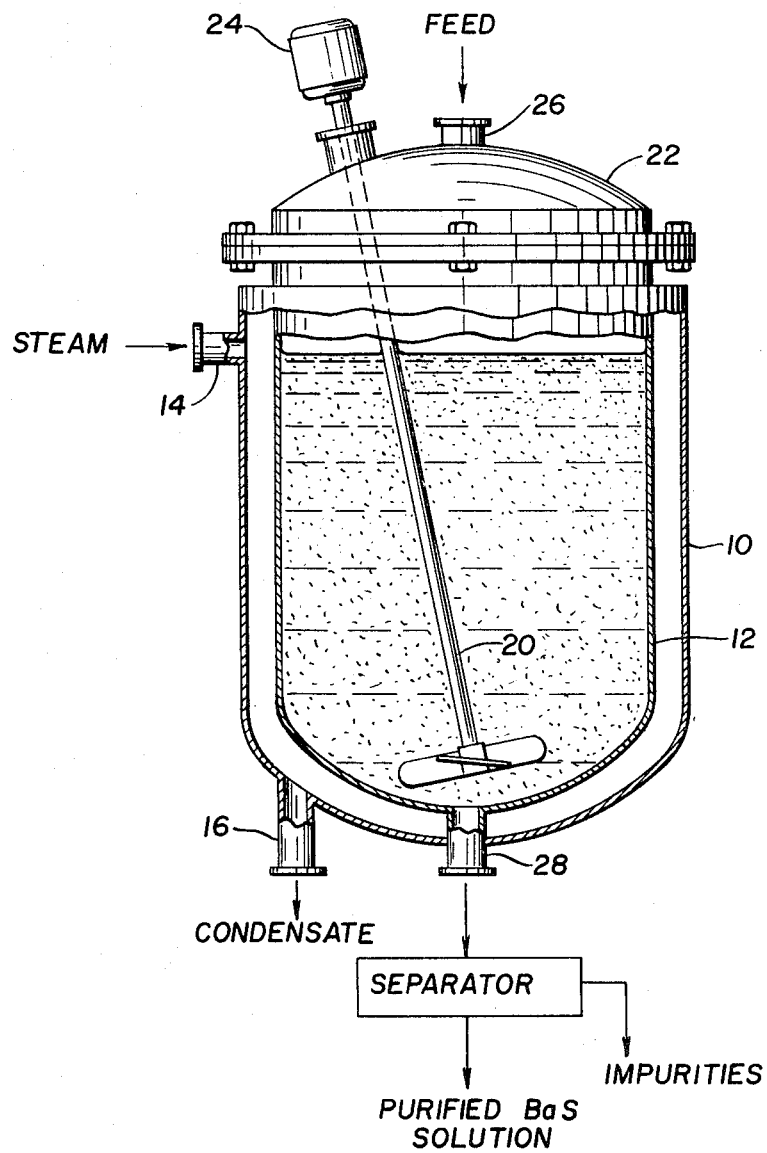
FIG. 1 is a side view partially cut away of a typical treatment tank for carrying out the purification on a batch basis.

In FIG. 1 a treatment tank 10 has a jacketed inner vessel 12 and is fitted with a steam inlet 14 and condensate outlet 16. An agitator 20 is mounted on the tank cover 22 and is powered by a motor 24. The leach liquor to be purified is passed into the treatment tank 10 through top port 26. The anhydrous magnesia-containing solid particles can be admitted as a dry powder through the same port 26, or as a slurry, or may be premixed with the leach liquor. After the solution has been agitated and held at the treatment temperature for a sufficient time to assure substantial removal of the impurities, the purified solution and precipitated solids are taken from the treatment tank 10 through drain port 28 and separated as by filtering or centrifuging the mixture. If the particular feed stock liquor requires other treatment, such further treatment may be carried out in the same tank if conditions permit, either concurrently or sequentially with the purification treatment with magnesium oxide material.

While the process is described herein as a batch process, the invention can be modified to achieve a continuous process.

In selecting the magnesia-containing material for use in this invention, several chemical and physical properties of the treating agent should be considered. In order to prevent contamination of the BaS solution, it is preferred that no deleterious ions be introduced with the treating material. There exist several substantially insoluble magnesium compounds which contain the oxide form of magnesium. It is preferred that the treating material have a water solubility of less than about 100 p.p.m. at the treatment temperature. It is also preferred that the treating material contain no water of hydration.

The mechanism of reaction by which the aluminum impurity is precipitated with the magnesium oxide material is not fully understood. The particle size of the treating material appears to be significant in achieving fast reaction. Calcination of magnesia-containing compounds, such as magnesite, basic magnesium carbonate or magnesium hydroxide, in the temperature of about 900 to 1500° C. produces an essentially pure magnesia (MgO) preferred for use in this invention. Calcined magnesite is commercially available having an average screen size of less than 200 mesh. The finer material (400 mesh or smaller particles) is very reactive. Such material has a loose bulk density of about 200–500 grams/liter, with a bulk density of less than 300 g./l. being the better material.

Example I

A barium sulfide solution from the leaching of black ash contains 160 grams/liter of BaS and 0.408 g./l. $Al_2O_3$ impurity. The specific gravity is 1.138 and the treatment temperature is 75° C. The magnesia-containing material is calcined magnesite (Type A) containing 97 to 99 wt. percent MgO. The particle size is sufficient to pass through a 200 mesh screen and the bulk density is about 220 to 270 g./l. The weight ratio $MgO:Al_2O_3$ is 4.9:1, equal to 2.0 grams/liter of the treating agent. The aqueous barium sulfide solution containing the aluminum oxide impurity is contacted with the magnesium oxide particles for one hour while agitating the mixture. The solids are filtered and the purified solution contains 0.013 g./l. $Al_2O_3$, equal to 96.5 wt. percent removal of the impurity.

Example II

A concentrated aqueous BaS solution (sp. gr.=1.115) containing 0.233 g./l. of $Al_2O_3$ impurity was treated for 1 hour at 70–75° C. with a magnesia-containing material consisting essentially of magnesium carbonate. The treating agent was commercially available $MgCO_3$ (Michigan Chem. Co. No. 71009–P–2). By contacting the solution with 3.9 gm. $MgCO_3$/liter (equiv. ratio $MgO:Al_2O_3=8.1$) the impurity was reduced to a concentration of 0.143 g./l. (64.2% removal). By raising the ratio of treating agent to impurity, the removal can be improved. Using 7.4 gm. $MgCO_3$/liter (equiv. ratio=15:1), the impurity concentration was reduced to 0.004 g./l. (98.3% removal). Thus, the chemical composition of the magnesia-containing treatment material is seen to have a substantial effect on the necessary amount of MgO present in the treating agent.

Example III

Figure 2:
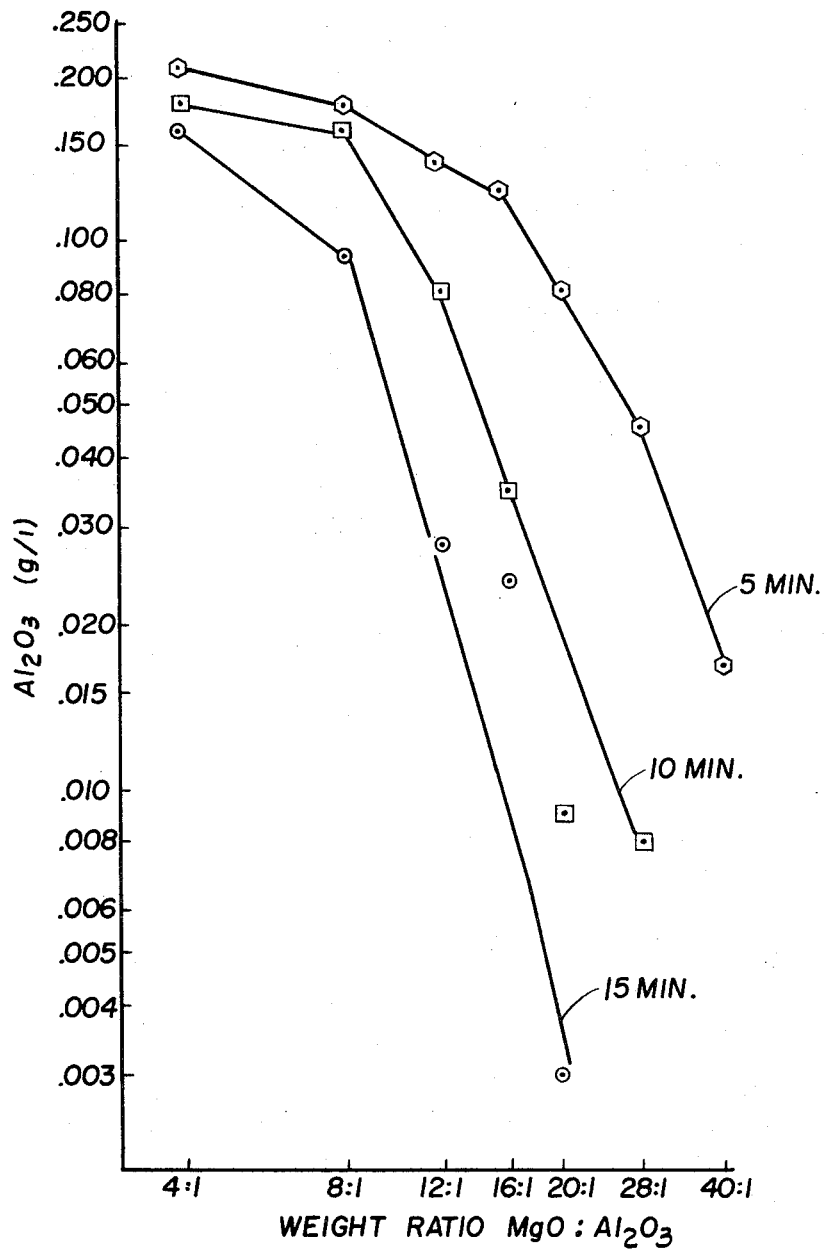
FIG. 2 is a logarithmic plot of final aluminum oxide concentration vs. $MgO:Al_2O_3$ weight ratio for the purification treatment

The procedure of Example I was repeated, except that 2.0 g./l. of reagent grade magnesia (Type B) was used to treat the BaS solution at 65–75° C. for 2 hours. The solution (sp. gr.=1.115) contained 0.214 g./l. of $Al_2O_3$ impurity, which was reduced to 0.124 g./l. by the treatment. Even with the relatively high 9.3:1 weight ratio, the pure reagent grade MgO did not equal the performance of calcined material. This suggests that the thermal history of the treating agent can be an important consideration in selecting the material. It is known from prior literature that calcining magnesia-containing materials from 900 to 1500° C. or higher has a substantial effect on the crystalline properties and solubility of the calcined product. The effect of variations in the weight ratio of added magnesia (MgO to aluminum impurity (expressed as $Al_2O_3$) prior to the purification treatment was studied over a wide range of $MgO:Al_2O_3$ weights. The log-log graph of FIG. 2 plots the effects of these changes upon the concentration of aluminum impurity in the treated BaS solution. This series of experiments was conducted at or near the boiling temperature (95–100° C.) of the aqueous BaS solution which had a specific gravity of 1.115 and contained 0.232 to 0.253 g./l. of aluminum impurity. The three curves shown in FIG. 2 represent a time parameter for the period of contact between the BaS solution and MgO-containing treatment material. The treating agent (Type C magnesia) was a slightly less reactive form of calcined magnesite than used in Example I (Type A). Type C HgO has a bulk density of about 320–480 g./l. and an average particle size less than 200 mesh. The MgO content of the calcined magnesite was about 97–99%.

As can be seen in the three curves of FIG. 2, impurity removal can be effective with short treatment periods if sufficiently high amounts of MgO are used. More than 90% impurity removal is realized in 5 minutes at the boiling point if the very large ratio of 40 parts MgO per weight part of $Al_2O_3$ is used, while considerably less treating material is needed to effect the same degree of impurity removal at longer contact periods.

Figure 3:
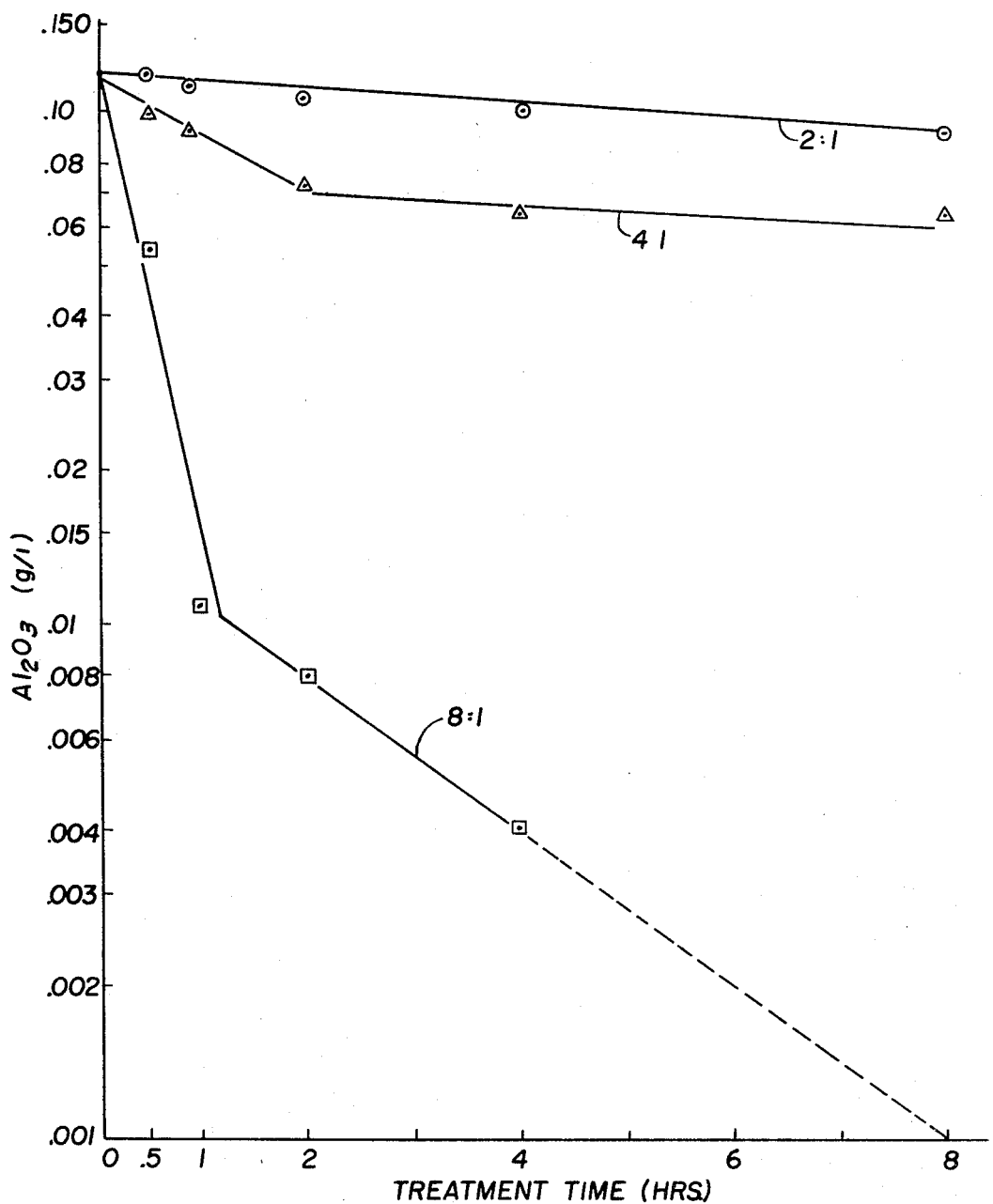
FIG. 3 is a semi-logarithmic plot of concentration vs. treatment time.

The effect of longer treatment times was studied at relatively low $MgO:Al_2O_3$ ratios to determine the optimum conditions for economical operation of the purification process. In FIG. 3 a semi-log plot of final aluminum impurity concentration vs. time is given for the ratios of 2:1, 4:1 and 8:1. These data were taken for a treatment temperature of 95–100° C. using Type C magnesia (calcined magnesite) material as in the reactions shown for FIG. 2. The aqueous BaS solution (sp. gr. =1.074) contained about 0.120 to 0.126 g./l. of aluminum oxide impurity. The extended treatment times had little effect upon impurity removal for the low values of 2–4 parts MgO per part $Al_2O_3$, and even at 8 hours less than 50% of the impurity was removed. However, at a ratio of 8:1 more than 99% can be removed in 8 hours.

Example IV

Some aluminum impurity can be removed at ambient temperature; however, it is usually not considered a commercially feasible process because the concentrated BaS leach liquor must be kept at higher temperatures to prevent the BaS from precipitating. During the normal operation of a black ash leaching plant, the black ash is contacted with hot water at about 60–80° C. to separate the barium from the residue. Therefore, it is convenient to treat the saturated leach liquor while maintaining the temperature of the leach effluent to prevent loss of BaS from the product stream. This example is given merely to demonstrate that the purification of aluminum-containing aqueous BaS solutions can be performed at lower temperatures. While the specific gravity of a saturated BaS solution at leaching temperature is usually more than 1.115, at 31° C. the specific gravity of the saturated liquor is only about 1.074. Type C magnesia was used as the treating agent. After 8 hours of treatment at 31° C. the aluminum impurity was decreased from 0.136 g./l. to 0.109 g./l. (19% removal), using a $MgO:Al_2O_3$ ratio of 4:1. For the same conditions, a weight ratio of 6:1 decreased the impurity to 0.100 g./l. (26% removal). While the new treatment is operable at ambient temperature, the process is extremely slow below about 60° C.

Examples V–XI

A number of magnesia-containing treating agents were found to remove aluminum oxide impurity with various degrees of success. In Table I these reagents are listed and the results of the purification treatment are shown for each treatment. The contact time was 2 hours, and the treatment temperature was 65–75° C.

TABLE I

| Ex. | Treating agent | Conc. (g./l.) | BaS gravity (sp. gr.=g./l.) | Impurity conc. (g./l.) Before | Impurity conc. (g./l.) After | Percent removal |
|---|---|---|---|---|---|---|
| V | $Mg(OH)_2$ (magnesium hydroxide) | 2.9 | 1.120 | 0.350 | .291 | 16.8 |
| VI | $CaMg(CO_3)_2$ (dolomite) | 2.0 | 1.124 | .296 | .168 | 43.2 |
| VII | CaO·MgO (calcined dolomite) | 2.0 | 1.126 | .365 | .255 | 30.1 |
| VIII | $MgSO_4 \cdot 7H_2O$ (magnesium sulfate) | 12.0 | 1.133 | .348 | .192 | 36.8 |
| IX | $MgC_2O_2 \cdot 2H_2O$ (magnesium oxalate) | 7.4 | 1.133 | .348 | .103 | 70.5 |
| X | $Mg(NO_3)_2 \cdot 6H_2O$ (magnesium nitrate) | 12.8 | 1.133 | .348 | .107 | 69.3 |
| XI | MgO (Type A) | 2.0 | 1.140 | .408 | .011 | 96.7 |

The above comparative table shows the relative reactivity of several magnesia-containing materials. The concentration of treating agent in Examples V and VIII–XI was equivalent to 1.2 g./l. Mg (2.0 g./l. MgO basis). Those materials having soluble components or water of hydration were less effective than the stoichiometric equivalent of calcined MgO.

Examples XII–XV

A weight ratio of $MgO:Al_2O_3$ less than 4:1 can be used to obtain substantially complete removal of the aluminum impurity; but the increased time required for such removal may be too long for some operations. Table II shows the treatment of a concentrated BaS solution at about 75° C. with Type A MgO in an amount to give a 3.1:1 ratio (0.50 g./l.). The initial impurity concentration was 0.159 g./l. Al₂O₃.

TABLE II

| Example | Treatment time (hrs.) | Al₂O₃ conc. (g./l.) | Percent removal |
|---|---|---|---|
| XII | 1 | 0.094 | 41 |
| XIII | 2 | 0.070 | 56 |
| XIV | 4 | 0.007 | 96 |
| XV | 6 | 0.006 | 96 |

While the process has been described by specific examples, there is no intent to limit the inventive concept except as set forth in the following claims.

What is claimed is:

1. A process for removing an aluminum oxide impurity from an aqueous barium sulfide solution comprising the steps of contacting the solution containing aluminum oxide impurity with finely divided anhydrous magnesia-containing solid material in an amount sufficient to precipitate at least 90% of the aluminum oxide impurity, and separating the barium sulfide solution from the magnesia-containing and aluminum oxide materials.

2. The process of claim 1 wherein a weight ratio of magnesia to aluminum oxide greater than 4:1 is used and wherein the solution is agitated and heated between about 60° C. and 100° C. for at least 1 hour.

3. The process of claim 1 wherein the magnesia-containing material consists essentially of calcined magnesite having an average particle size smaller than 200 mesh and a bulk density less than about 500 g./l.

4. The process of claim 1 wherein the purified barium sulfide solution has an aluminum oxide content less than 0.02 grams/liter.

5. A process for treating hot aqueous BaS leach solution containing about 145–175 g./l. BaS for removing an aluminum oxide impurity from the BaS solution which comprises the steps of:
    admixing the BaS solution containing aluminum oxide with sufficient magnesium oxide particles to remove substantially all of the aluminum oxide by precipitation;
    maintaining contact between the hot BaS solution and the magnesium oxide particles until substantially all of the aluminum oxide impurity has precipitated from the solution; and
    separating the BaS solution from the magnesium oxide and aluminum oxide precipitate.

References Cited

UNITED STATES PATENTS

| | | | |
|---|---|---|---|
| 648,772 | 5/1900 | Moffatt | 23—134 |
| 1,856,194 | 5/1932 | Seailles | 23—52X |
| 2,163,388 | 6/1939 | Wuethrich | 23—137 |
| 2,605,167 | 7/1952 | O'Brien | 23—134 |
| 2,651,563 | 9/1953 | Rentschker | 23—186 |

FOREIGN PATENTS

| | | | |
|---|---|---|---|
| 514,583 | 11/1939 | Great Britain | 23—186 |
| 859,249 | 1/1961 | Great Britain | 23—186 |

OSCAR R. VERTIZ, Primary Examiner

G. O. PETERS, Assistant Examiner